June 18, 1940. E. BUGATTI 2,205,030
VEHICLE, AND ESPECIALLY AUTOMOTIVE RAILROAD VEHICLES
Original Filed May 16, 1935 5 Sheets-Sheet 4

Inventor:-
Ettore Bugatti
By Mauro & Lewis
Attorneys

June 18, 1940.　　　　　E. BUGATTI　　　　　2,205,030
VEHICLE, AND ESPECIALLY AUTOMOTIVE RAILROAD VEHICLES
Original Filed May 16, 1935　　　5 Sheets—Sheet 5
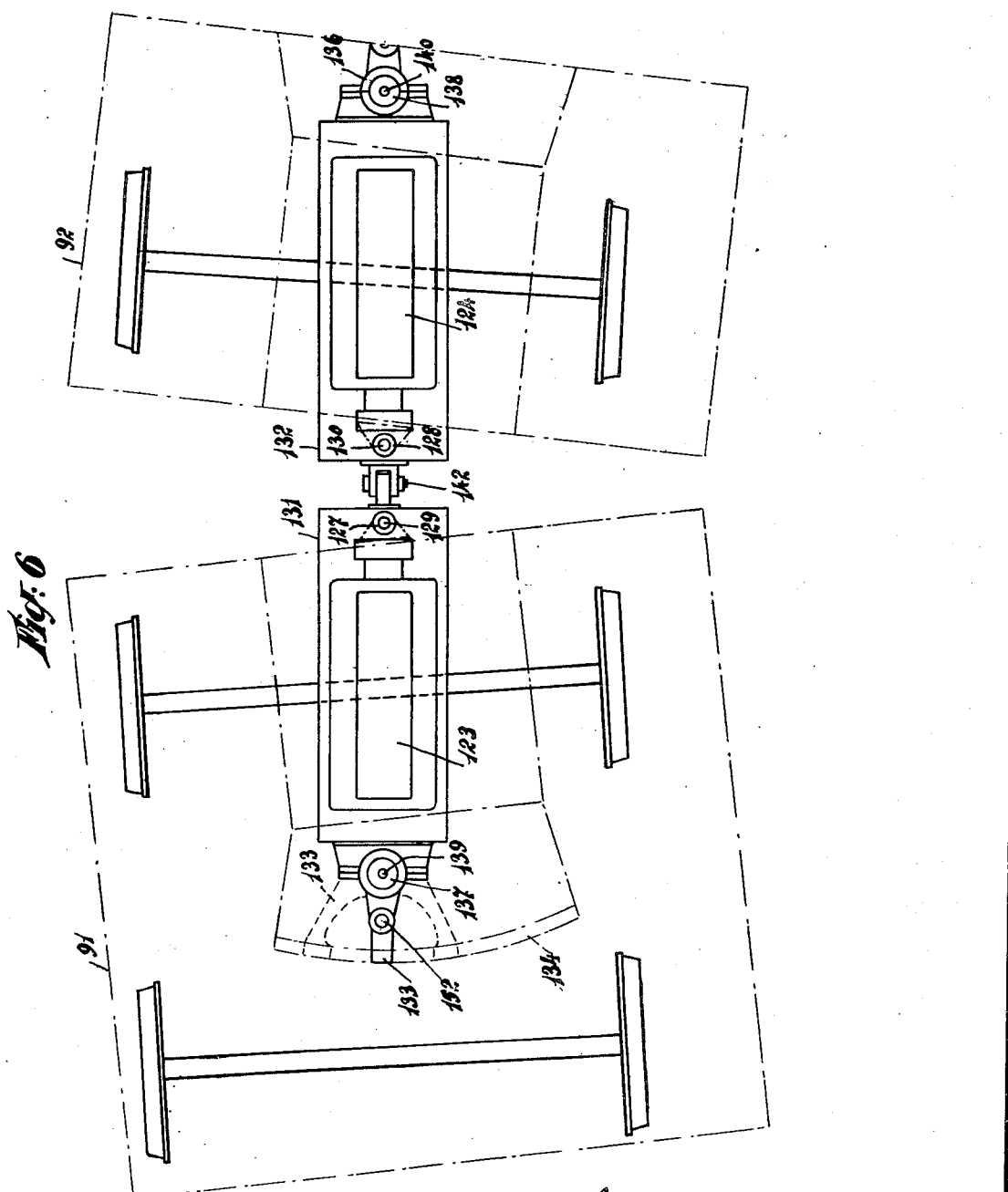

Patented June 18, 1940

2,205,030

UNITED STATES PATENT OFFICE 2,205,030

VEHICLE, AND ESPECIALLY AUTOMOTIVE RAILROAD VEHICLES

Ettore Bugatti, Molsheim, France

Original application May 16, 1935, Serial No. 21,869, now Patent No. 2,115,095, dated April 26, 1938. Divided and this application August 23, 1937, Serial No. 160,551. In France November 22, 1934

14 Claims. (Cl. 105—133)

This invention which is a division of my U. S. Patent Application Ser. No. 21,869, filed May 16, 1935, Patent Number 2,115,095, issued April 26, 1938, relates to vehicles, particularly railroad vehicles, and has for an object to provide a coupling device for such vehicles. This coupling device is arranged in such manner that the bodyworks of two vehicles coupled together cannot move transversely with respect to each other but that each of them can effect movements about a longitudinal axis, i. e. rolling movements, and that, when running along a curve, the bodies can freely take an angular position with respect to each other.

The coupling device according to the present invention essentially comprises:

(a) A coupling beam which connects together the two adjacent trucks in the vehicles and which is rigid in a direction transverse to the track;

(b) One or two guiding members compelled to remain vertical or substantially vertical by connection with this coupling beam; and (c) Coupling bars carried by the vehicles and provided at their ends with universal joints which are guided by the members stated under b.

This combination of elements permits of obtaining the result above stated.

The invention may be carried out in different manners. If both universal joints above mentioned are compelled, through a suitable connection, to remain at substantially the same height, or if they form a single device together, the coupling device according to the present invention has the further advantage of opposing relative displacements of the respective bodies of the two vehicles in the vertical direction.

The bodies of the vehicles rest upon the trucks through suspension devices permitting free working of these trucks and in this connection, the usual coupling through king-bolts between the frame and the trucks is done away with. The adjacent trucks of the two vehicles coupled together form a kind of composite truck by reason of their connection through the coupling beam.

When the system of wheels thus formed moves past a point where there is a slight local deviation of the track, for instance runs over two successive misaligned rails, the transverse displacement transmitted to the bodies through the guiding members and the coupling bars is greatly reduced, so that the bellows between the bodies are subjected to much less considerable strains. Furthermore, when running along a curve, the adjacent ends of the two bodies are shifted toward the inside of the curve.

A further object of my invention is to provide a self-propelled vehicle or combination of vehicles by associating with this coupling device one or several apparatus serving to wholly or partly propel one or both of the vehicles coupled together. These apparatus may be motors, motive power receivers, etc., and in the following description, for the sake of simplicity, they will be called motors or engines.

In this embodiment of the invention, motors, and also a portion of the transmission gear interposed between the driving wheels and the members through which they are driven may be supported by the beam connecting together the adjacent trucks of the two vehicles to be coupled together. As above explained, the weight of the frames or bodies of the vehicles is transmitted to the trucks without the intermediary of said beam, and the motor or motors do not participate in the movement of the vehicle bodies with respect to said beam. The motor or motors are thus located at a place where they occupy but very little of the space available in the vehicle bodies, and, for practical purposes, it is possible to dispose them nearly under the bellows through which the vehicle bodies communicate with each other, if such bellows are provided. However, even if the motors occupy a portion of the useful space, this portion is always smaller than the space occupied by the motors in the arrangements used up to this time. Furthermore, the portion of the useful space within the vehicle bodies that is occupied by the motors is of relatively little importance because it is close to the wheels and passengers avoid, whenever possible, to occupy seats located in the vicinity of the wheels. Finally, the arrangement above stated has the following advantages: the motors or engines are located closer to the members that are to be driven by them; consequently the transmission shafts or equivalent members are shorter and consequently perturbations are less likely to occur; the displacements of the motors or engines in the vertical direction with respect to the wheels are generally of smaller amplitude than if the motors were carried by the vehicle body; finally the motors, which are as a rule very heavy are located as low as possible, that is to say in a position advantageous from the standpoint of stability of the vehicles.

In an embodiment of the coupling device according to the invention wherein the beam, instead of forming a structure rigid throughout consists of at least two portions jointed together about a horizontal axis, being still rigid in the transverse direction, the weight of the engines imposed on the two jointed sections of the beam may be distributed between the frame of one of the vehicles and the corresponding truck of the coupling device. It will be readily understood that a number of the above mentioned advantages are still retained with this arrangement.

I may also, according to the present invention, provide a coupling device in which the beam is made of two sections articulated with each other without impairing the transverse rigidity of the whole, and in which each of these portions is suspended from the corresponding vehicle frame. In this case, the engines carried by the respective sections of the beam are suspended from the vehicle frame but the advantages inherent to their low position and their location close to the wheels are maintained. In this case, the coupling device has a modified form which is comprehended within the scope of the present invention, independently of the special arrangements provided for receiving the motor or motors.

According to another feature of the present invention, the coupling beam may be used as an intermediate member for transferring the whole or a part of the load from the body of each vehicle to the corresponding trucks. The load, or portion of the load, may be transmited either rigidly or elastically from the body or frame of the vehicle to the coupling beam and either rigidly or elastically from said beam to the trucks.

This modification of the coupling device can be applied for obtaining articulated trains or locomotives.

Preferably, the loads are transmitted to the middle part or in the vicinity of the middle part of the coupling beam.

In any case, the loads are transmitted to the coupling beam in such manner that they are preferably distributed evenly between the trucks coupled together by said beam.

This embodiment of the coupling device according to the present invention has the advantage of being generally simpler than the first mentioned embodiment of the coupling device according to the present invention. This is due to the fact that, in this first embodiment, the precautions to be taken for ensuring the relative movability of the truck not only with respect to the body of the vehicle but also with respect to the coupling beam are often more difficult to observe in the case of the first mentioned embodiment, than in the case of the last modification. When this relative movability is ensured by means of systems of shoes and slideways, no great difficulties are met with. On the contrary, the problem is more difficult to solve if, in order to reduce friction, it is desired to utilize rollers having a fixed axis.

Other features of the present invention will result from the following detailed description of specific embodiments thereof.

Preferred embodiments of the present invention will be hereinafter described with reference to the accompanying drawings, given merely by way of example, and in which:

Figs. 5 and 6 are views, analogous to Figs. 1 and 2, respectively, showing still another embodiment of the invention in which the weight of the motors or engines is supported by the frames of the vehicles;

Fig. 7 is a view analogous to either of Figs. 1, 3 or 5 of an embodiment in which the weight of the motors or engines is supported partly by the frames of the vehicles and partly by the trucks.

In the figures that will be referred to (which are diagrammatic) I have shown only those parts which are necessary for explaining the invention.

Figure 1:
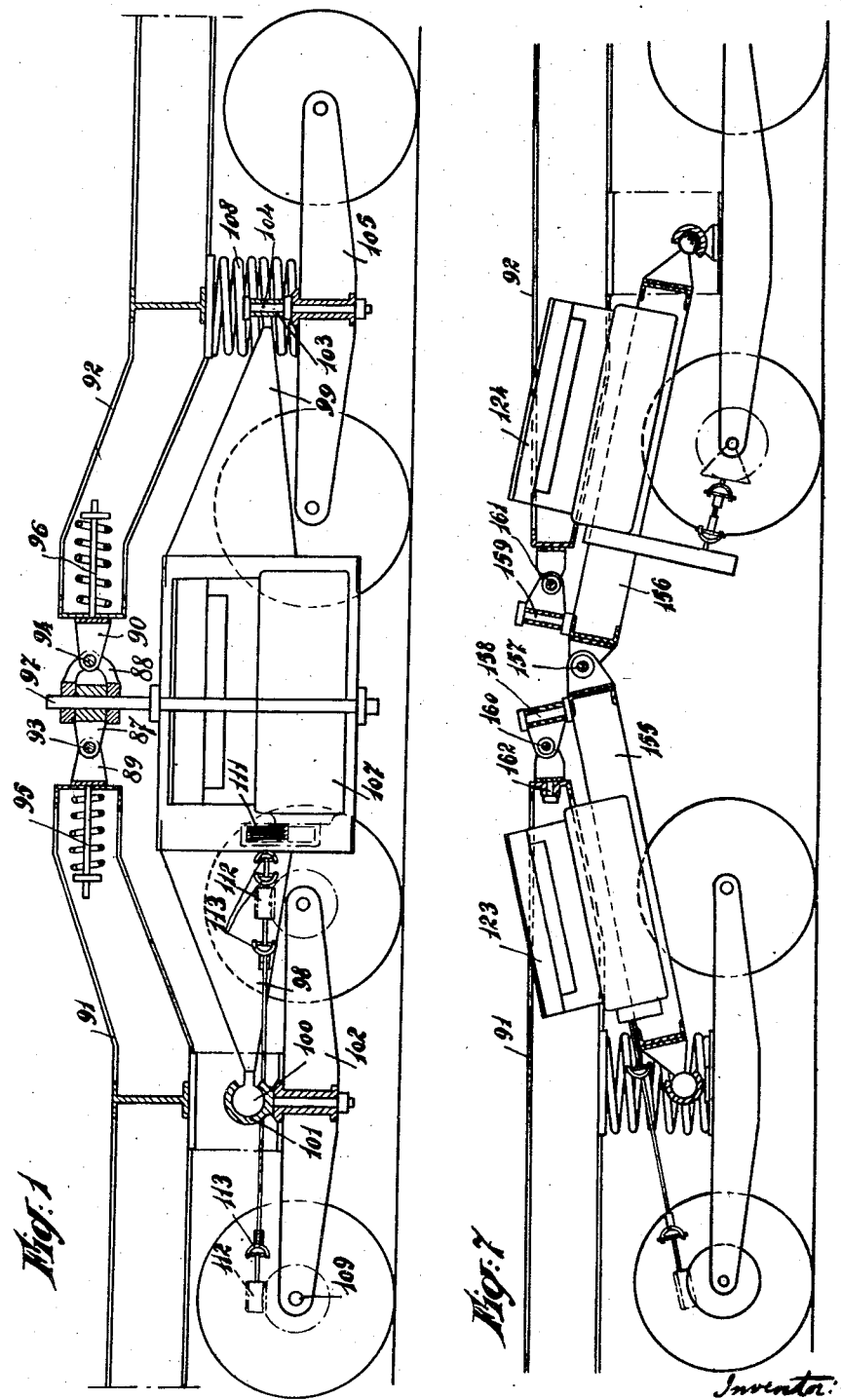
Fig. 1 is a longitudinal axial sectional view of two vehicles connected together through a coupling and motor supporting device according to the present invention.

In the embodiment illustrated by Fig. 1, the frames 91, 92 of the two vehicles are connected together by a coupling structure which comprises swivel stirrups 89, 90 having spring loaded rod portions 95, 96 respectively; hinged to stirrups 89, 90 through transverse pins 93, 94, are two members 87, 88 rotatably mounted on a transfixing central pivot 97 along which they may rise and fall.

Pivot 97 is supported by a coupling beam forming a box-like structure and made of two main parts 98, 99 attached together through detachable connection means conventionally shown at 165, 166, 167 and 168. Each section of the coupling beam as shown, has a dropped hollow portion for housing an engine or motor, the engines being designated by reference numerals 106 and 107 respectively. The coupling beam is provided at one end with a spherical member 100, adapted to cooperate with a corresponding spherical socket 101. This socket is carried by one of the trucks the frame of which is designated by reference numeral 102. The section 99 of the coupling beam is provided at its end with a sleeve 103, coaxially mounted on a king-bolt 104 carried by a truck, the frame of which is designated by reference numeral 105. The substitution of sleeve 103 for a ball and socket joint is intended to ensure that engines 106 and 107, carried by sections 98 and 99 of the coupling beam, may be maintained in a substantially vertical position, that is to say is intended to prevent the coupling beam from overturning on one side or the other. As will be readily understood any other arrangement giving the same result may be employed.

Frames 91 and 92 rest upon the corresponding trucks 102 and 105 respectively through a suitable suspension, for instance coil springs such as 108. Engine 107 drives axles 109, 110 through a clutch 111 and gears 112, Cardan joints 113 being interposed at suitable places. The transmission shaft extending between gears 112 may, besides Cardan joints 113, include sliding portions in order to allow longitudinal extension of the shaft in response to individual displacements of the axles with respect to the frame of the truck. The other engine 106 is mounted in the same manner as engine 107 with respect to the coupling gear and particular showing is deemed unnecessary.

Of course, for arranging the engines inside coupling beam 98, 99, I may have recourse to all the arrangements known in the art, and, for instance, the engine may be elastically suspended, a hydraulic clutch may be utilized, etc. In a likewise manner all the improvements known in the art may be applied to the transmission connecting the wheels with the engine, the transmission indicated on the drawings being shown merely for illustrating purposes. Also in the drawings it has been assumed that the coupling beam was made of two parts substantially identical with each other located on either side of a median longitudinal plane of symmetry, and that the two engines were positioned symmetrically in this coupling beam, but these arrangements may be modified if so desired without departing from the principle of the invention.

Figure 2:
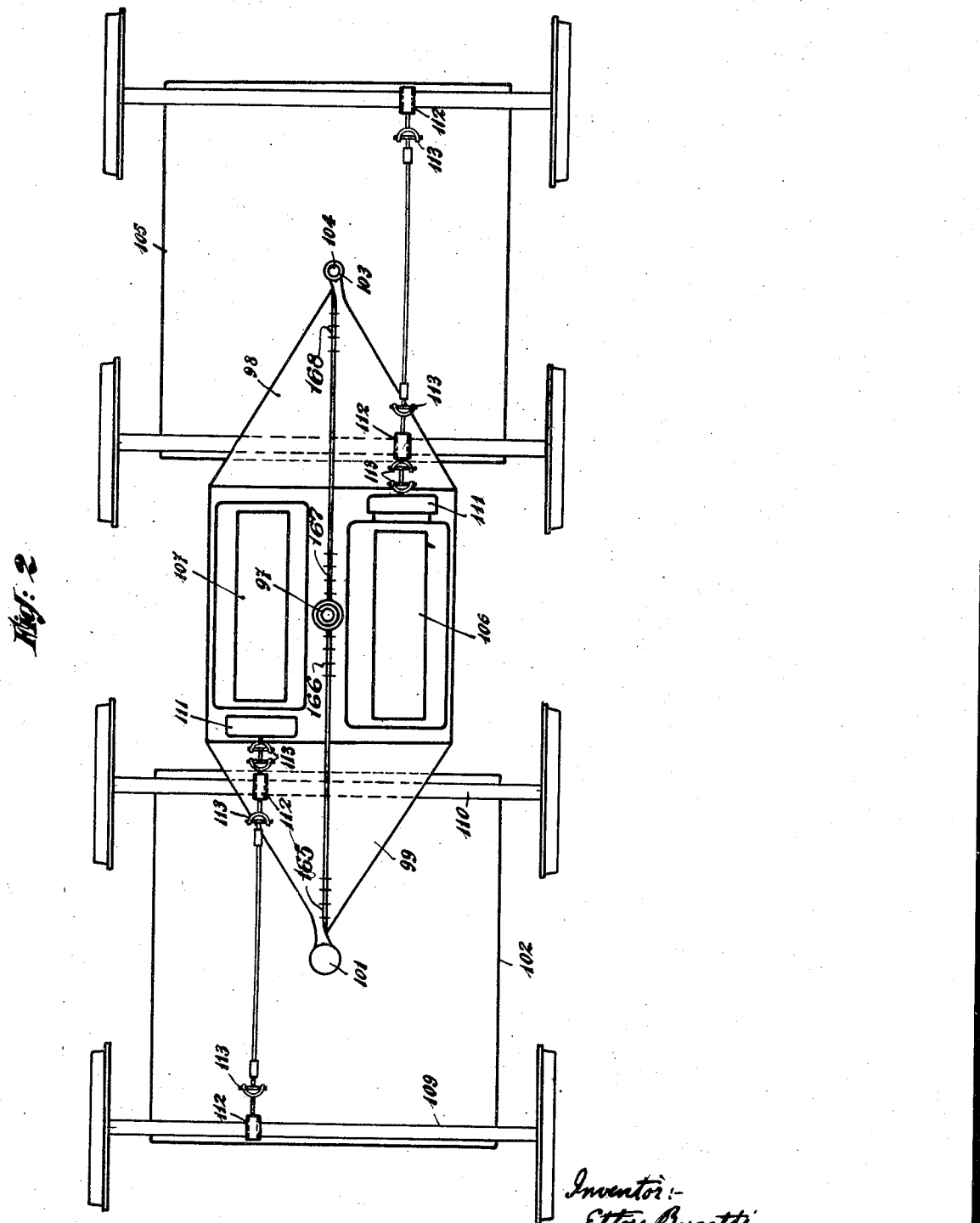
Fig. 2 is a plan view corresponding to Fig. 1, the frames of the vehicles having been omitted.
Figure 3:
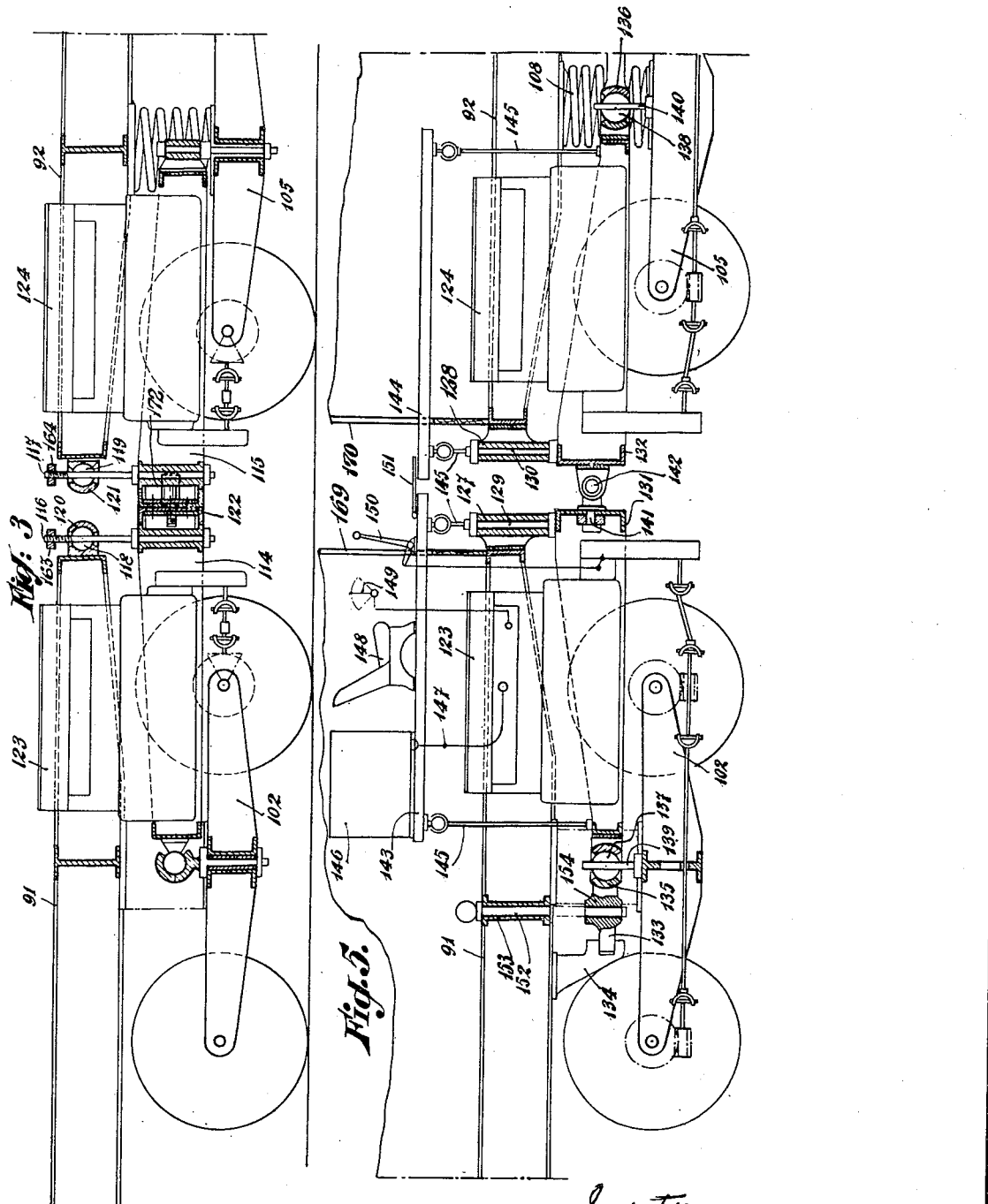
Figs. 3 and 4 are views, analogous to Figs. 1 and 2, respectively, of another embodiment of the invention.
Figure 4:
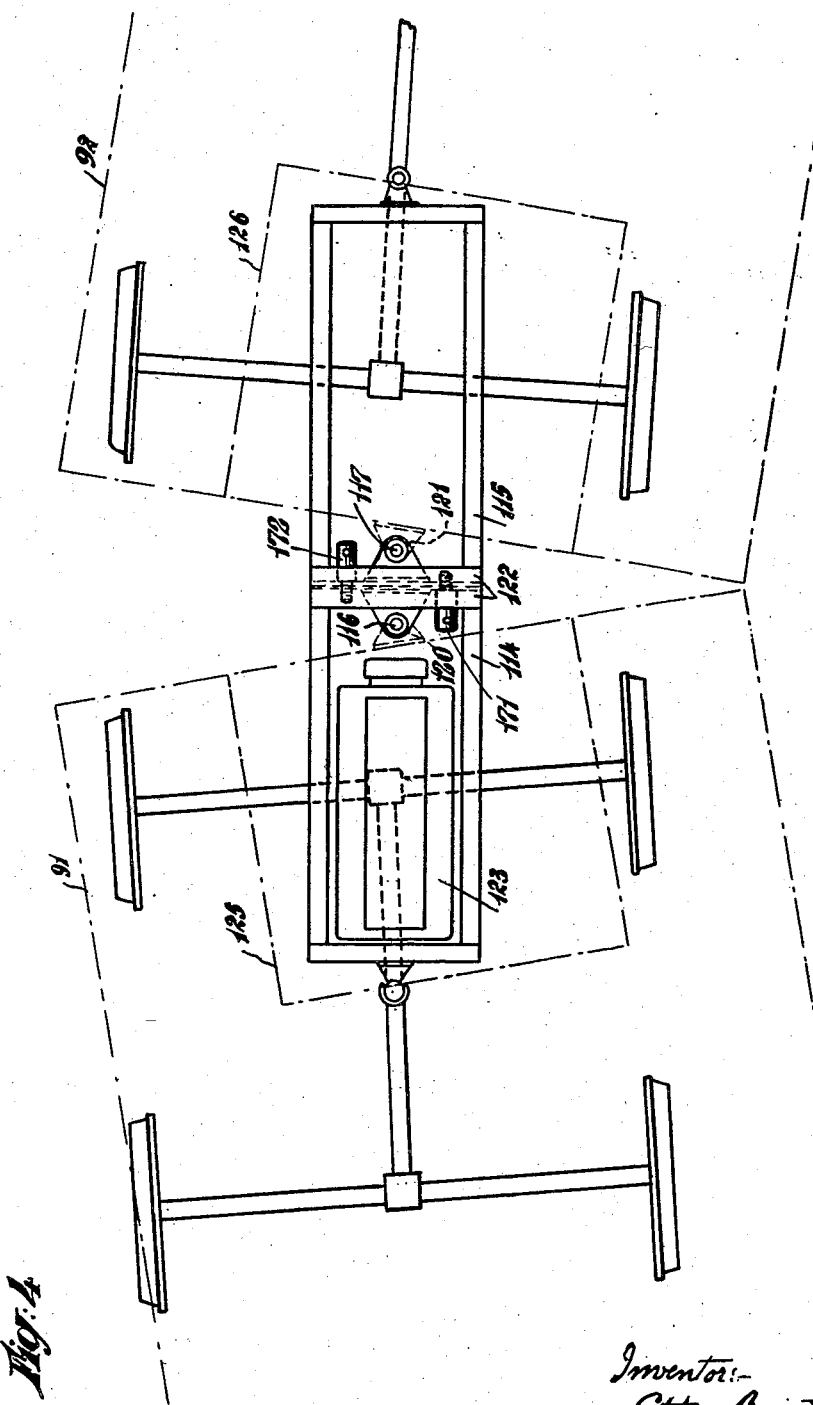

In the embodiment shown by Figs. 3 and 4, the coupling beam is given, as in the preceding embodiment, the shape of a rigid member of two halves substantially identical with each other, but said halves are placed end to end, symmetrically with respect to a plane transverse to the track. The two portions 114 and 115 of this coupling beam carry two guiding rods 116 and 117, respectively, on which are slidably mounted spherical elements 118 and 119, respectively. These spherical elements are fitted in spherical sockets of corresponding diameters 120 and 121 carried by frames 91 and 92. The two portions of the coupling beam are assembled together through their adjacent ends at 122 in any suitable manner, for instance through detachable coupling means conventionally shown at 170, 171 on Figs. 3 and 4. At its ends, the coupling beam is connected to trucks 102 and 105 as above described with reference to Figs. 1 and 2. The two halves 114 and 115 of the coupling beam carry the engine units 123 and 124, respectively. These engine units serve to drive the corresponding trucks 102 and 105. Under these conditions, if the two halves 114 and 115 of the coupling beam are separated from each other, two independent vehicles with their own engines are obtained, provided of course that care be taken to support the individual sections of the coupling member, for instance by means of a stop conventionally shown at 163, 164 at the top of guiding rods 116 and 117 respectively.

Frames 91 and 92 must, as shown in dotted lines at 125 and 126 on Fig. 4, be provided with sufficiently large openings in order that engines 123 and 124 may have, with respect to their respective frames 91 and 92, the movements that result from the relative displacements of the trucks when the vehicles negotiate curves. If the engine control station and various accessory members are to be placed close to the engine, I may, as it will be hereinafter described, provide a platform, disposed above each of the engines and resting, like them, upon the coupling beam. In this case, this platform will undergo, with respect to the frame of the vehicle, the same relative displacements as the engine.

Figs. 5 and 6 show a slightly different coupling device. In this embodiment, the articulated coupling bars and the members for assembling the two halves of the coupling beam are partly merged together. The frames 91 and 92 carry, at their adjacent ends, two sleeves 127 and 128 in which can turn spindles 129 and 130 carried by the two halves 131 and 132 of the coupling beam of the vehicles. This coupling beam 131, 132 is connected to the frames 91, 92 on the one hand through the spindles 129, 130 just above mentioned, and on the other hand through parts 133 which are adapted to move in slideways 134 or similar members annexed to the frame The two portions 131 132 of the coupling beam carry spherical sockets 135, 136 adapted to receive corresponding spherical members 137, 138 slidable along king-bolts 139, 140 carried by trucks 102, 105. Furthermore, the two portions of the coupling beam are connected together by a connecting system including two axes of articulation, one of which, 141, is longitudinal, while the other one 142 is disposed transversely. This connecting system is the only one that is to be uncoupled for separating the two vehicles from each other. When the cars are disconnected, it is readily apparent from the drawings that each section of the beam is supported from the corresponding vehicle through members 134 and 127. As in preceding embodiments, the two portions of the coupling beam support the engines of the vehicles 123, 124. It is clear that these engines are supported by the frame which, in turn, rests upon the trucks, for instance through springs 108. The engines drive the axles in any suitable manner, as above explained.

Fig. 5 further shows two platforms 143, 144 respectively supported by the portions 131, 132 of the coupling beam, through rods 145 or equivalent means provided at their upper ends with ball and socket joints. In the drawings, platform 143 supports a fuel tank 146 communicating with the engine through a pipe 147, the seat 148 of the driver, a hand lever 149 for controlling the throttle of the engine and a clutch control lever 150. A movable plate 151 is adapted to bridge the two platforms. Of course, the vehicle bodies have open ends 169, 170 (for instance as needed by the use of customary vestibules) through which the platforms 143, 144 bridged by the plate 151 are arranged to pass. In this figure I have also shown a detachable device for securing the beam element 131 in laterally fixed position when disconnected from the other beam element 132, that is to say when the vehicle on the left hand side of the figure is separated from the vehicle on the right hand side. This fixation device includes a spindle 152 passing through a socket 153 carried by frame 91 and engaging a socket 154 carried by beam element 131.

Fig. 7 shows a modification in which the two portions 155, 156 of a coupling beam having the shape of a widely open V are articulated with each other about a horizontal spindle 157 which constitutes the only member of the coupling device that is to be inserted in position or removed for coupling or uncoupling the vehicles the frames of which are designated, as in the preceding embodiments, by reference numerals 91, 92. When the cars are disconnected, the beam sections 155, 156 are supported at one end by the corresponding truck and at the other end by the members articulated on pivots 160 or 161 to be later on described. The obliquity of the two portions of the coupling beam with reference to a horizontal plane is not necessary, but in certain cases it is more advantageous for placing the parts. Therefore, the coupling beam may also include two portions located practically in line with each other. At their adjacent ends the beam elements 155, 156 are provided with pivots 158, 159 which are connected to the corresponding frames through members including each a transverse articulation 160, 161. On one side of one of the vehicles, vehicle 91 for instance, there is further provided a longitudinal articulation 162, but this articulation does not exist on the other side, in order to make it impossible for the coupling beam to overturn laterally, that is to say in order that engines 123, 124 may always keep their longitudinal median plane in a substantially vertical position. Furthermore, I have shown diagrammatically in the drawings two devices for driving the axles through transmission gears from the engines.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for coupling the adjacent ends of two railroad vehicles having separate adjacent end trucks, which comprises two rigid structures, one for each vehicle, detachably connected to one another so as to form a longitudinal coupling beam, rigid in the transverse direction; means for attaching each of said rigid structures to the corresponding vehicle end, adapted to provide for pivotal movement of said vehicle, at least about an axis which passes through a predetermined point of the said rigid structures, intermediate its length, and lies in a longitudinal vertical plane; means providing a swivel connection between each rigid structure at the outer end thereof and the corresponding truck; a motive power source on one of said rigid structures; and means for driving the corresponding truck from said source.

2. In a vehicle, the combination of a body having an articulated extension at an end for coupling purposes; a truck below the body in the vicinity of said end; means for transferring load from the body to the truck; and a motor supporting frame having an end pivotally mounted on said articulated extension and its other end pivotally mounted on said truck.

3. In a combination of two vehicles having adjacent ends coupled through an articulated structure; a separate truck for supporting the end of each of the adjacent vehicles; a transversely rigid beam extending from the truck at a vehicle end to the adjacent truck at the other vehicle end, having pivotal connection with each truck; a substantially vertical pin mounted in a transversely immovable position on said beam, further positioned in transfixing relation with respect to the articulated coupling structure; at least one motor on said beam, intermediate the trucks; and means for driving one of said trucks from said motor.

4. In a system of vehicles having separate, adjacent bodies and an articulated coupling structure which is operatively interposed between the adjacent ends of said bodies and includes two sections respectively attached to the said body ends, and a substantially vertical pivot pin arranged to connect and hinge said sections together, the combination of: a separate truck for supporting the end of each of the adjacent vehicle bodies, disposed beneath the corresponding body in the vicinity of the corresponding coupled end; a longitudinal beam for connecting said trucks together, having pivotal connection with each of them, said beam having a dropped hollow portion between the trucks; a motor in the dropped hollow portion of the beam; means for driving one of the trucks from said motor; and means for holding said substantially vertical pivot pin in a transversely immovable position with respect to said beam.

5. The combination of claim 4, in which the longitudinal beam comprises two detachably connected, transversely juxtaposed sections, the dropped hollow portion between the trucks includes a motor housing for each section, the said motor being disposed in one of said housings, a further motor being disposed in the other housing and means being provided for driving the other truck from said second motor.

6. In a system of two adjacent vehicles having an articulated coupling structure, the combination of a separate truck for supporting the end of each of the adjacent vehicles; and a longitudinal member in said articulated coupling structure, extending from one of said trucks to the other and pivotally connected with each of the trucks with its longitudinal center line in the vertical plane passing through the points of pivotal connection with said trucks, said member including a dropped motor housing between the trucks.

7. In a system of two adjacent vehicles having an articulated coupling structure, the combination of a separate truck for supporting the end of each of the adjacent vehicles; a longitudinal truck coupling member in said articulated coupling structure having pivotal connection with each of said trucks, positioned with its longitudinal center line in the vertical plane passing through the points of pivotal connection with said trucks, and means attached to said truck coupling member, intermediate the trucks, for imparting driving power to at least one of said trucks.

8. In a system of two adjacent vehicles having bodies and a separate truck for supporting the end of each of the adjacent vehicle bodies, disposed beneath the corresponding body, the combination of an articulated structure for coupling said vehicles together, including a longitudinal truck coupling member having pivotal connection with each truck, positioned with its longitudinal center line in a vertical plane passing through the points of pivotal connection with said trucks, said member extending between the bodies and the trucks; and a motor attached to the truck coupling member below one of the vehicle bodies, said motor protruding upwardly into said body.

9. The combination of claim 8, the truck coupling member including two detachably connected sections, disposed end to end in a longitudinal vertical plane, the motor being attached to one of said sections, a further motor being attached to the other section, below the other vehicle body, and arranged to protrude upwardly into said other vehicle body.

10. A vehicle which comprises a body having an aperture in its bottom part adjacent one of its ends; a truck for supporting the end of the body, beneath said body, adjacent said end; a rigid member extending longitudinally below said body adapted for attachment at its outer part with the corresponding member in another vehicle; means including a substantially vertical pivot for coupling said truck with said member, at a point remote from said body end; means including another substantially vertical pivot for supporting said member at least partly from the vehicle body adjacent said end thereof; a motor attached to said member, arranged to protrude upwardly into the body through said aperture; and means for driving said truck from said motor.

11. In an automotive vehicle, the combination of a vehicle body; a substantially horizontal swinging arm beneath said body, supported from said body, pivotally mounted at one of its ends on the vehicle body and adapted to be coupled with a corresponding arm on another vehicle; a truck beneath the arm, pivotally connected thereto; a motive power source on said arm; means for transmitting motive power from the source to the truck; means for transferring load from the body to the truck; and guiding means on the vehicle body at a point remote from said end thereof, cooperating with the swinging arm for causing it to remain substantially horizontal.

12. In a vehicle, the combination of a vehicle body; a motor supporting frame beneath said body, supported from said body, pivotally connected thereto at an end thereof so as to be capable of swinging to and fro in a substantially horizontal plane and adapted to be coupled with a corresponding swinging frame on another vehicle; a truck below said motor supporting frame, pivotally connected thereto; means for transferring load from the vehicle body to the truck; and means operative for locking the motor supporting frame against swinging motion with respect to the vehicle body.

13. In an automotive vehicle, the combination, with a vehicle body having an open end and a bottom aperture adjacent thereto, of a wheeled automotive unit adapted to support said body, including a motor located with its top portion in exposed position at the upper part of said unit, said unit having its upper part which projects into the body through the bottom aperture therein, so that the motor top portion is accessible from within the vehicle body, while the remainder of the unit lies below the body, the unit being pivotally connected to the body so as to swing with respect to the same in a substantially horizontal plane, and including a lower portion adapted for connection at its outer end with the lower portion of a corresponding unit in another vehicle, and an upper tread and seat portion adapted to be bridged with the corresponding tread and seat portion of said corresponding unit in another vehicle, through said open end of the vehicle body.

14. In a self-propelled railroad vehicle having a body, the combination of a rigid structure disposed below said body at an end portion thereof, means for suspending said structure from said body, including a pivotal connection at the extremity of said body constructed and arranged to enable pivotal movements of said body about a substantially vertical axis and a device, spaced apart from said connection, to guide said rigid structure in said pivotal movements relatively to the said body, a motive power source on said structure, a truck having wheels beneath said body, means including a substantially vertical pivot pin for jointing universally said structure to said truck, means for driving the truck wheels from said motive power source, and means for transferring load from said body to said truck.

ETTORE BUGATTI.